500 u GLASS SPHERES 200 u NICKEL SPHERES

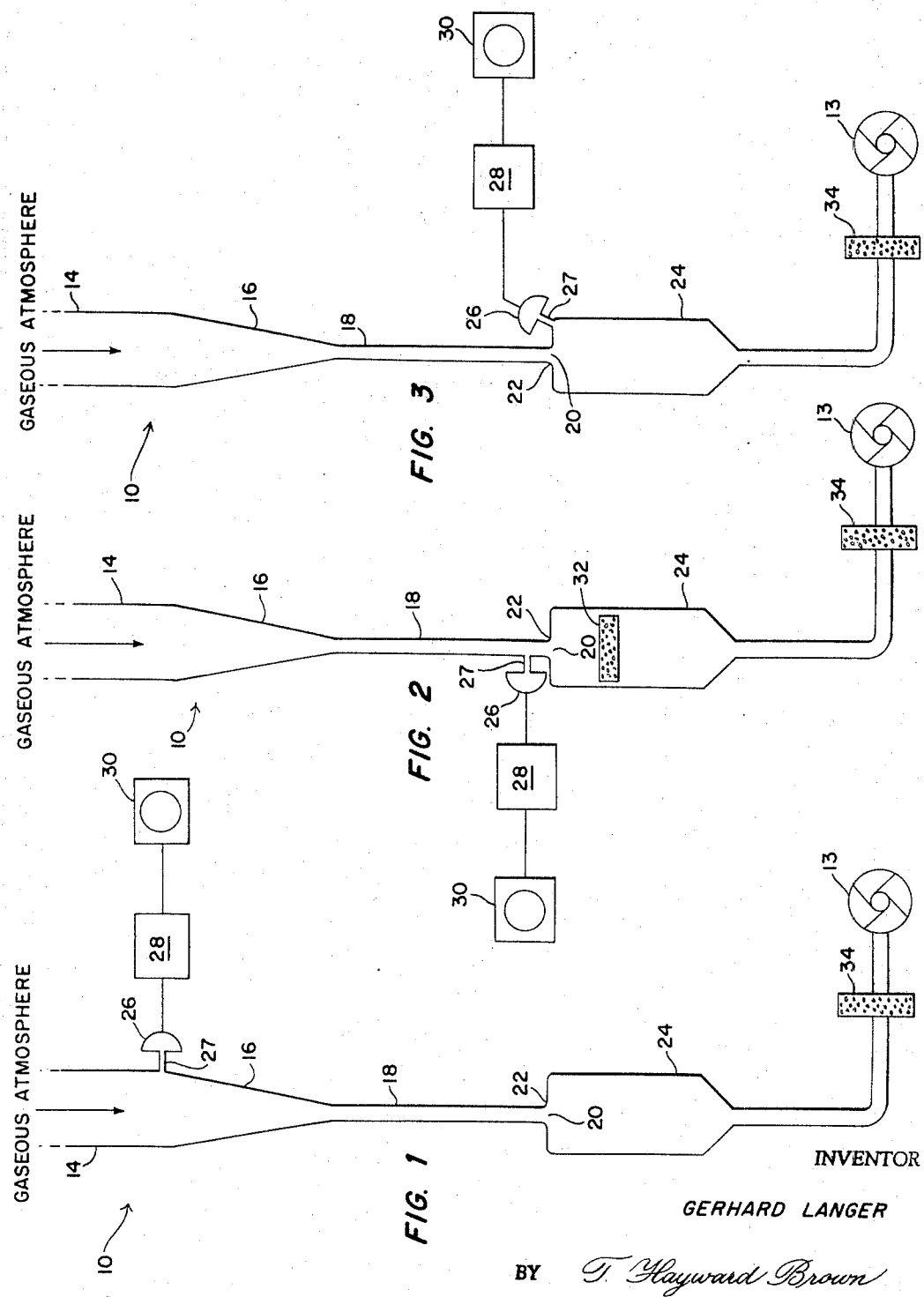

GLASS SPHERES 30-60 u

ENTRANCE MICROPHONE

MICROPHONE NEAR CAPILLARY END

INVENTOR
GERHARD LANGER
BY T. Hayward Brown
ATTORNEY

United States Patent Office 3,434,335
Patented Mar. 25, 1969

3,434,335
APPARATUS FOR ACOUSTICALLY DETECTING MINUTE PARTICLES SUSPENDED IN A GASEOUS ATMOSPHERE
Gerhard Langer, Boulder, Colo., assignor to the United States of America as represented by the Director of the National Science Foundation
Filed July 29, 1966, Ser. No. 573,152
Int. Cl. G01n *31/00*
U.S. Cl. 73—28                                      18 Claims The invention described herein may be manufactured and used by or for the Government of the United States of America for governmental purposes without the payment of any royalties thereon or therefor.

The present invention relates to a new apparatus for detecting and counting minute particles suspended in a gaseous atmosphere which apparatus responds to the particles in a jet stream by emitting sounds.

More particularly, the invention relates to a new means for acoustically sensing and counting minute particles suspended in a gaseous atmosphere. In a particular embodiment of the invention, the particles to be counted are ice nuclei which serve as centers of formation about which ice crystals will grow if the proper environmental conditions exist.

Devices which enable scientists and others to detect the quantity of particles present in a gaseous atmosphere, such as the air, have application today in many important areas. Such devices are often used in chemical warfare research to detect the size of warfare agents released by a munition. The invention may further be used as part of a warning system in missile assembly plants which must be kept essentially dust free, and in areas where gyroscopes and other fine precision instruments are assembled. Another use for particle counting devices is to detect fly ash composition near electrical power plants as a monitoring apparatus for smoke stacks. The present invention also provides a means for determining the efficiency of a filter by measuring the amount of dust entering and leaving the filter.

It has been observed that dust or particles injected into an air stream will produce a change in the flow noise, as noted in dust-feeding devices. It was discovered that when a gaseous substance flows through a tube which is abruptly restricted by means of a short piece of capillary tubing, single particles contained in said gaseous substance emit a noise signal. This signal was found to be in the nature of a short, clicklike sound audible to the ear and was superimposed upon the normal noise made by the flow of the air through the tube. The present invention presents a novel and efficient sensing device which counts the number of particles in a given gaseous atmosphere by detecting the audible sounds generated by said particles.

Previous attempts at developing a practical acoustic particle counter or sensor have not been successful in that previous sensors could only detect particles over 100 microns in diameter, and even then the signal to noise ratio was too poor for electronic counting. However, with the particle counter of the present invention, particles with one linear dimension exceeding 10 microns may be detected regardless of their density. Other particle counters which have been developed are far more complicated and less efficient than the sensor which is the subject of the present invention.

At present, various means of counting and detecting particles in a gaseous atmosphere have been developed. The prior art contains many devices which produce this result, each utilizing some physical or chemical property of the particles as a medium of detection. For example, Quynn Patent No. 2,675,697 shows a means for measuring the size and quantity of air-borne particles which means utilizes a series of screens containing various size holes therein. This device relies on the physical dimensions of the particles themselves as a medium of detection. Grant Patent No. 2,489,286 discloses a particle counter wherein the opacity of a dust laden plate is optically measured. Vonnegut Patent No. 2,684,008 employs an electro-optical system to detect condensation of nuclei in a cloud chamber. Also, the prior art teaches the electro-static charged particle concept of counting the dust content of the atmosphere, as for example in Feifel Patent No. 2,994,035.

None of the above mentioned prior art devices use the sounds of particles flowing in a gaseous atmosphere through a capillary restriction as a medium of detecting the quantity of said particles, as does the present invention.

Early attempts at constructing an acoustic particle counter are described in an article authored by the present inventor in the June 1963 issue of Research/Development magazine. The present invention embodies an entirely different concept for counting the particles in a gaseous atmosphere from that described in the above mentioned patents, and describes a much improved and more efficient acoustic particle counter than is described in the inventor's June 1963 magazine article. The present invention for the first time discloses an acoustic particle counter with a high degree of sensitivity, which is required for a clean electrical signal. A new tapered portion of the particle counter aids performance by reducing background noises, as well as providing a smooth transition of fluid flow to a capillary restriction portion. This feature is important due to the fact that laminar flow through the device must be maintained notwithstanding a Reynold's number as high as 14,000 (corresponding to a velocity of approximately 130 meters/second). Another novel feature of the present invention is the abrupt diameter change in the particle counter at the exit from the capillary restriction portion. This abrupt change produces a loud, distinct signal, as compared to the weak and noisy signal generated in previous devices.

A preferred embodiment of the acoustic particle counter comprising the present invention includes a tube through which a gaseous atmosphere containing the particles to be counted is passed, said tube comprising a constant diameter entrance portion, a capillary restriction portion, a tapered connecting portion between said constant diameter portion and said capillary restriction portion, said capillary restriction portion of said tube having an exit chamber portion providing the tube with an abrupt change in diameter at this point, and acoustic-sensing means placed in communication with said tube to detect the sound emitted by particles contained in the gaseous atmosphere as they pass through the tube. Suitable amplification and display means are connected to the acoustic sensing means, thus enabling an observer to electronically or acoustically measure the quantity of particles in the gaseous atmosphere being tested.

Accordingly, it is an object of the present invention to provide an acoustic particle counter which can determine the amount of particles in a gaseous atmosphere by detecting the sound emitted by the particles as they pass through a constricted tube. It is a further object of the invention to provide an extremely simple, inexpensive, rugged and easily operated device for counting the amount of particles in a gaseous atmosphere.

It is a further object of this invention to provide an acoustic particle counter constructed in such a manner that the background noise emitted from the tube is at a minimum as a gaseous atmosphere containing particles is flowing therethrough.

A further object of this invention is to provide a device which will detect the number of particles in a gaseous atmosphere even though said gaseous atmosphere to be tested is turbulent in nature.

A further object of this invention is to provide an acoustic particle counter wherein acoustic sensing devices are located with respect to said counter to give sharp, clean pulses for electronic counting.

A further object of this invention is to provide an acoustic particle counter which will detect particles in a gaseous atmosphere down to a size of 10 microns.

An important use of the present invention resides in a means for detecting the amount of ice nuclei present in a given portion of atmosphere. Information pertaining to ice nuclei is extremely important in meteorological work, since the presence or absence of such nuclei is a controlling factor in the formation of ice crystals, and the ice crystals in turn constitute the elemental particles out of which rain (except in the tropics), snow, and hail is formed. These ice nuclei constitute minute particles, known as aerosol particles, which are suspended in the atmosphere along with other dust particles. Upon the supersaturation of the water vapor in the air, these ice nuclei along with condensation nuclei become the centers for the formation of small droplets of water under the proper conditions. These nuclei must be present to serve as the centers of formation for a condensation process. Without the presence of these nuclei, a region can become supersaturated without condensing.

It is therefore an object of the present invention to provide an embodiment thereof which allows the detection of ice nuclei present in the atmosphere. In an application of this embodiment, air is humidified and then cooled to form a supercooled cloud, and ice crystals form on any active ice nuclei which are present. The crystals will grow rapidly to a size exceeding 10 microns in some particular plane at the expense of the moisture from the supercooled cloud droplets. The crystals enter an acoustic sensor and emit sound pulses which can be monitored by listening with a stethoscope disposed on said sensor. The pulses can also be monitored electronically with a pulse counter or an oscilloscope.

It is, therefore, one object of the present invention to provide a novel apparatus for counting minute particles suspended in a gaseous medium, which particles can serve as centers of formation for the growth of ice crystals.

Another object of the invention is to provide an automatically operating monitoring apparatus responsive to the sound emitted by particles passing through an air stream in a constricted tube, so as to give a reliable representative count of the ice nuclei contained in the air stream.

A further object of this invention is to provide an acoustic particle counter which will detect the dust particles in the atmosphere which, when in contact with supercooled drops, will cause the drops to freeze. This is important in cloud physics research and cloud seeding.

A further object of this invention is to provide a desirable apparatus for counting ice crystals in supercooled clouds.

Still another object of this invention is to provide an instrument which responds to particles in the air by being responsive to the sounds emitted by the particles in the air.

Other objects, features, and many of the attendant advantages of this invention will be appreciated more readily as the same becomes understood by reference to the following detailed description, when considered in connection with the accompanying drawings, wherein like parts are identified in each of the several figures by the same reference character, and wherein:

FIG. 1 is a diagrammatical sectional view of an acoustic particle counter wherein an acoustic sensing device is located adjacent the entrance to a constriction in said device;

FIG. 2 is a device similar to that shown in FIG. 1 wherein an acoustic sensing device is located adjacent said constriction;

FIG. 3 is a view similar to FIGS. 1 and 2 wherein the acoustic sensing device is located adjacent the exit portion of said constriction;

Figure 4:
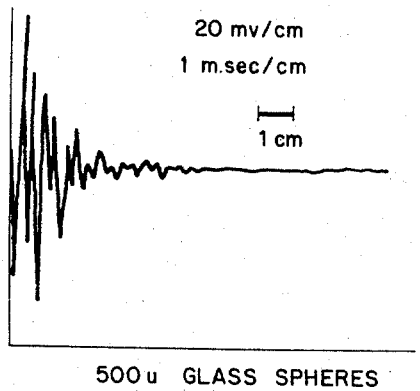
FIGS. 4–7 are illustrative oscilloscope patterns showing traces of single particles as detected in a device constructed according to the present invention.
Figure 5:
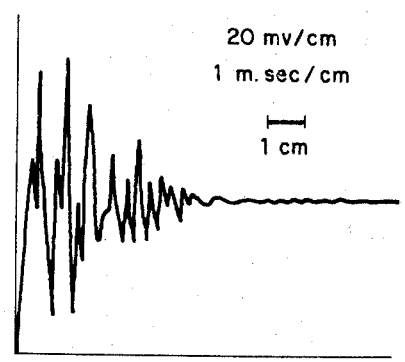
Figure 6:
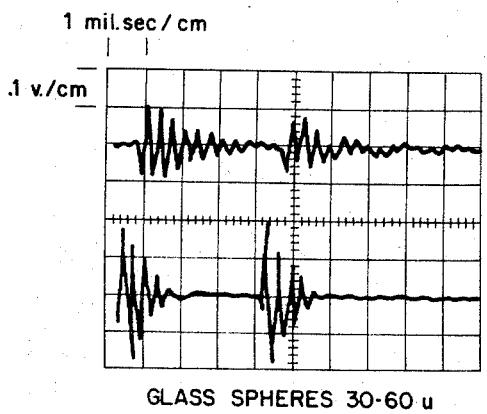
Figure 7:
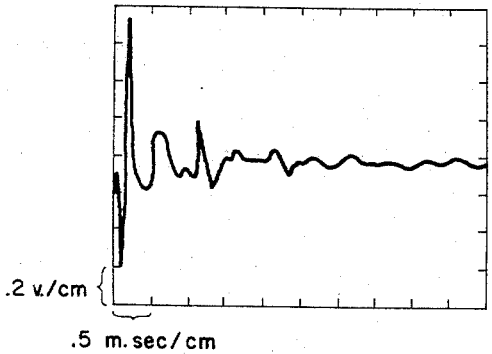

Referring now to the drawings, and in particular, to FIGURE 1, there is shown a hollow tube 10 comprised of a smooth walled material, such as glass or capillary tubing, through which a gaseous atmosphere, such as air, containing minute particles to be counted is passed. The hollow tube 10 may also be composed of metal or plastic so long as a smooth laminar transition of the gaseous atmosphere through the tube is provided. The gaseous atmosphere containing the particles to be counted may be drawn through the tube 10 by means of pump or suction means 13 located at the exit of the tube. Other suitable means, such as a piston pump located at the entrance to said tube, may be provided to accomplish the flow of the gaseous atmosphere through the tube.

The gaseous atmosphere containing the particles to be counted enters the acoustic sensing device or sensor through a straight entrance portion 14 of the tube 10, which entrance portion is substantially constant in diameter throughout the length thereof. The sensor may be operated in the absence of this straight entrance portion 14. However, if the unit is operated in open air where turbulence exists, it is advisable to use an entrance portion about 5 centimeters long to give the turbulence a chance to decay before the air enters the capillary restriction portion 18 of the sensor, to be described.

At the end of the entrance portion 14 of the tube 10 is a linear tapered frusto-conical portion 16 which leads to a smooth capillary restriction portion 18 of said tube. While the dimensions of the tapered section of the device are not critical, it has been found that optimum results occur when the tapered portion 16 is approximately 5 centimeters long. It is important, however, that the inside surface of said tapered portion be relatively smooth and have an even transition to the capillary. The critical dimensions for the operation of the device are the length and the diameter of the capillary restriction 18. If the restriction is less than 1 centimeter in length, the particles passing through the device are not sufficiently accelerated to produce the desired noise effect. Tests have shown that a capillary restriction length of 6 centimeters produces optimum results. Tests have also shown that the optimum inner diameter of the capillary restriction 18 is between 1.5 and 3.5 millimeters. Below a diameter of 1.5 millimeters, it has been observed that the audible signals generated by said particles as they pass through the sensor are relatively weak. At diameters above 3.5 millimeters, undue air noise is created due to turbulence. It has been noted that the shorter the capillary restriction 18, the sharper the signal pulse which is generated.

At the exit of the capillary restriction portion 18, the diameter of the tube 10 changes abruptly as shown at exit portion 20. This abrupt change in the diameter of tube 10 at the exit of the capillary restriction portion 18 is necessary to produce a loud signal. The transition into the exit portion 20 from the capillary restriction portion 18 must be relatively smooth, with a radius of curvature 22 approximating 1 millimeter. The diameter of the exit portion 20 is not too critical, and for convenience is usually the same diameter as entrance portion 14. The length of the exit section 24 of the tube 10 only has to be sufficient to attach whatever connections are necessary at the terminal portions of said sensing device.

As the particles pass through the particle counter, or sensing device, acoustic signals are produced for reasons which will be explained. Acoustic sensing devices, such as electronic microphones, are placed at various points adjacent the length of the tube 10 to receive these signals. The most convenient place to locate a microphone is adjacent the entrance to the linear tapered portion 16 of the tube 10 as shown in FIGURE 1. Microphone 26 is attached to a small sidearm 27, which sidearm is a hollow tube of relatively small diameter attached perpendicular to the entrance portion 14 of the tube 10 at the side thereof. The hollow portion of sidearm 27 is in communication with the hollow portion of entrance portion 14, thereby providing a path along which a sound signal generated in the sensing device may be detected by said microphone 26. The microphone 26 is connected to an amplifier 28 which amplifies the signals generated in the sensing device by the moving particles, and displays said signals on an oscilloscope 30 where they may be observed. Oscilloscope 30 is connected to amplifier 28 by any suitable means. Other means for displaying the signals amplified by amplifier 28, such as a loudspeaker, may be connected to the microphone 26 and amplifier 28 in place of the oscilloscope 30 within the concept of the present invention.

For sharp, clean pulses for electronic counting, locating the microphone 26 adjacent the end of the capillary restriction portion 18 is considered most advantageous. This embodiment is shown in FIGURE 2, where the sidearm 27 is shown adjacent the bottom of capillary restriction portion 18. The microphone 26 is attached to the sidearm 27 in the same manner as disclosed in FIGURE 1, and the amplifier 28 and oscilloscope 30 (or loudspeaker) are similarly connected as shown in FIGURE 1 to the microphone 26. The microphone 26 must be attached to the capillary restriction portion 18 and sidearm 27 in such a way that no leakage exists. Also, with the microphone 26 adjacent the exit of the capillary restriction portion 18 of the tube 10, it may be desirable to use a relatively longer capillary restriction portion 18 to attenuate any extraneous noises coming from the entrance of the sensing device.

FIGURE 3 discloses a third location for microphone 26, wherein said microphone is placed adjacent the exit portion 20 of the tube 10. This is a fairly noisy location, and it is not recommended that a microphone 26 be placed at this location if the other two locations as shown in FIGURE 1 and FIGURE 2 are accessible. The manner of attaching microphone 26 adjacent the exit portion 20 is the same as that described in conjunction with FIGURES 1 and 2.

When the gaseous atmosphere passing through the sensing device suddenly expands in the exit portion 20 of the tube 10, considerable turbulence is created which produces noise super-imposed upon the signal from the particles contained in the gaseous atmosphere. Reduction of this noise is desirable if a microphone 26 is used adjacent the end of the capillary restriction portion 18, as shown in FIGURE 2. In order to suppress this excess exit noise, a soft open plastic foam 32 having approximately 80 pores per inch and 1 centimeter thick is placed in the exit portion 20 of the tube 10, beneath the capillary restriction portion 18. In some applications, it may not be desirable to use the foam insert because it may become clogged; for example, by water drops, especially if temperatures below freezing exist. In that case, noise in the exit portion 20 can be reduced considerably by lengthening the exit section 24 to at least 5 cm. and having its diameter 2.5 cm. or above. In order to protect the pump or suction means 13 located at the terminal of the sensing device from becoming inoperative due to the particles passing through said sensing device, a filter 34 is placed in the exit section 24 of tube 10. Fliter 34 serves to muffle any sound emanating from the pump or suction means 13, and also serves to collect the counted particles before they enter the said pump or suction means.

It is also contemplated within the concept of the present invention that other acoustic sensing devices, such as a stethoscope, for example, may be used to detect the sounds generated by the particles in the sensing device.

In operation, a sample of the gaseous atmosphere, or air, containing the minute particles to be counted is introduced into the straight entrance portion 14 of the tube 10. If the capillary restriction portion 18 is approximately 1.5 millimeters in diameter, the flow rate of the medium entering the tube 10 may be as low as 5 liters per minute, while the minimum flow rate using a capillary restriction portion 18 of 3 millimeters is about 30 liters per minute. Tests have shown that audible sounds are created by single particles passing through an acoustic sensing device of the type disclosed in FIGURES 1 through 3. The sound created by each particle originates in the exit portion 20 of the tube 10, from where the sound travels upwards through the capillary restriction portion 18 and into the entrance portion 14. Therefore, the sound may be detected by an acoustic sensing device located as shown in either FIGURES 1, 2 or 3. Experiments indicate that the sound is caused by a shock wave which is probably generated when the flow of the gaseous atmosphere through the sensing device suddenly changes from laminar to turbulent in the exit portion 20. The flow stream just beyond the end of the capillary restriction portion 18 is a free jet and will remain laminar for a short distance beyond the end of the capillary restriction portion 18. It is in this latter region that a large difference in velocity suddenly develops between the flow stream and the particles to be counted by the device. The excess energy of the particles must be dissipated, and it is theorized that this dissipation takes the form of a low-pressure shock wave when the laminar jet flow changes to turbulent flow momentarily, which in turn generates a noise pulse. This hypothesis is supported by the observation that a water droplet triggering the sensing device is atomized in the exit portion 20 to a fine mist. Shock waves have been observed to atomize water droplets in a like manner.

The sounds created by the particles passing through the capillary restriction portion 20 are detected by the microphone 26, or other suitable acoustic sensing devices, which may be located adjacent the straight entrance portion 14 of the tube 10 as shown in FIGURE 1, or adjacent the end of the capillary restriction portion 18 as shown in FIGURE 2, or adjacent the exit portion 20 as shown in FIGURE 3. The signals detected by the microphones 26 are amplified by the amplifier 28, and then transmitted to an oscilloscope 30, or other suitable display means such as a loudspeaker, as shown in FIGURE 1. The signal displayed on the oscilloscope, or loudspeaker, can be translated into a reading of the number of particles passing through the sensing device by counting the number of pulses.

Typical oscilloscope traces of single particles are shown in FIGURES 4, 5, 6 and 7. Each pulse lasts about 2 to 4 milliseconds, depending upon the size of the particle, and each pulse has a fast initial rise. FIGURE 6 shows a comparison of the traces picked up at the microphone positions shown in FIGURES 1 and 2. Using a high frequency response microphone, the actual shock wave can be detected giving a much shorter pulse (see FIG. 7). Ordinarily, the shock wave sets the microphone diaphragm into oscillations and the oscillations are detected as they decay, and not the fast original shock pulse.

The embodiment disclosed in FIGURE 8 presents a novel application of the acoustic particle counter described hereinabove. The ability to detect dust particles in the air which, when in contact with super-cooled moisture drops will cause them to freeze, is of importance in cloud physics research and cloud seeding. Except at very low temperatures, only a few dust particles in a million will act as ice nuclei.

To find these particles in the air, one simulates the process of cloud formation; that is, moist air is cooled and the excess moisture condenses on the dust particles in the air to form small cloud drops. Also, some of the dust that does not take part in the condensation process may collide with the cloud drops. If the cloud is further cooled to below freezing temperatures, particles in the air behave as active icing nuclei, causing the cloud drops to freeze. Ice crystals thus formed have a much greater affinity for the water vapor in the cloud than the liquid water drops and grow at their own expense to considerable size. In a quarter of a minute, for instance, a small ice crystal may grow to 20 or 60 microns in one dimension, i.e., into a flake or rod. The drops will remain essentially at the same size of up to 10 microns, or they may decrease in size if there are many ice crystals present that take up the moisture. The acoustic particle counter in combination with a cloud chamber provides a novel and efficient means for detecting a few large ice crystals amongst the millions of liquid water drops in the clouds. Since the particle counter does not detect elements below 10 microns in size, only the crystals in the cloud chamber will be detected, and not the water drops.

Figure 8:
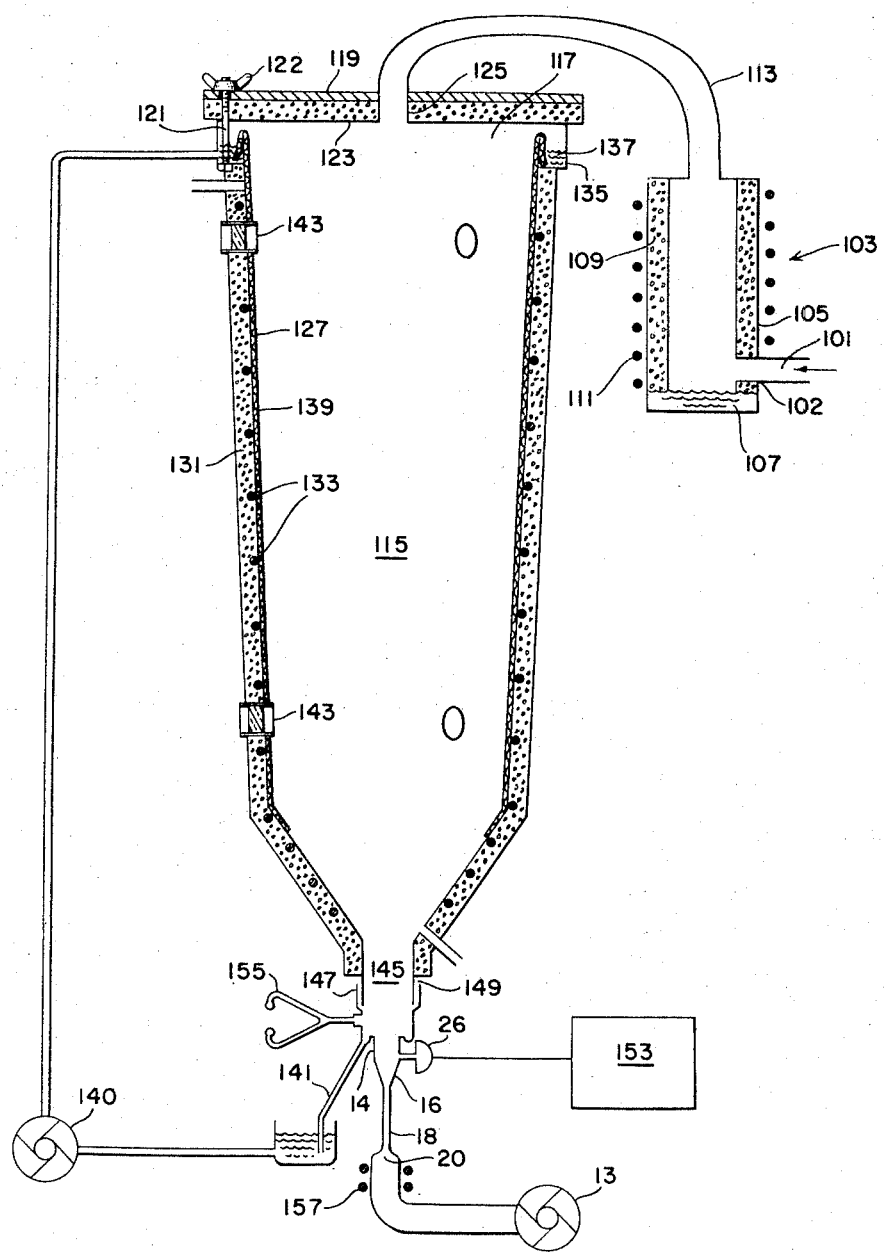
FIG. 8 is a diagrammatical sectional view of an ice nuclei acoustic counter in accordance with an embodiment of the present invention.

FIGURE 8 shows the basic features of an ice nuclei counter using the acoustic sensor. The entering air 101 containing dust particles is first humidified as shown in FIGURE 8 with a wetted wall tube 103. The wetted wall tube 103 consists of a chamber 105 containing a quantity of water 107 at the bottom thereof. The inner walls of the chamber 105 are lined with foam plastic 109 in order to wick the water 107 onto the sides of said chamber 105. The chamber 105 is encircled by a heating coil or other suitable heating means 111. The heating coil 111 evaporates the water 107 and mixes the water vapor thus produced with the air 101 as it passes through the chamber 105. At the top of the wetted wall tube 103 is a curved tube 113 leading into a cloud chamber 115. The curved tube 113 serves to carry the mixture of moist water vapor and air from the wetted wall tube 103 to the cloud chamber 115.

Another manner in which the air and water vapor mixture can be introduced into the cloud chamber 115 is to use a small beaker of water at the entrance to the chamber 115 which contains a submerged heating element to evaporate water and to warm the air.

If ambient temperatures are low, the connecting tube 113 leading from the wetted wall tube 103 to the cloud chamber 115 may have to be insulated to prevent condensation taking place in the connecting tube 113. Such condensation will reduce the moisture level of the air entering the cloud chamber 115.

The cloud chamber 115 comprises a wide diameter entrance portion 117 which is necessary to settle out large particles which give signals similar to ice crystals. The cloud chamber 115 is covered by a lid 119 which is fastened to the cloud chamber by means of the threaded studs 121 affixed to said chamber 115 and wing nuts 122. A suitable number of said threaded studs 121 are placed around the circumference of the cloud chamber 115 to provide a tight fit between said lid 119 and the cloud chamber 115. The side of lid 119 in communication with the cloud chamber 115 is lined with a foam sound absorbing material 123 attached to the inside of said lid 119. This foam reduces echoes from the signal generated as the ice crystals pass through the sensing device associated with the cloud chamber, as will be described. The foam in the lid is covered with a suitable moisture-proof covering to keep moisture from condensing in the foam and ruining its acoustic properties. The lid 117 and the sound absorbing material 123 contain a hole 125 in the center thereof through which the curved tube 113 leading from the wetted wall tube 103 enters cloud chamber 115.

The cloud chamber 115 comprises an inwardly tapering wall 127 which is surrounded by a thick insulation material 131 such as plastic foam. The tapered wall gives better flow control but a cylindrical wall, being easier to construct, is adequate. Contained within the insulation material 131 are refrigeration coils 133 which are connected to suitable refrigeration means which provide a coolant throughout said coils.

Attached to and integral with the top of the wall 127 is a trough 135 formed in a shape of a U. This trough contains an anti-icing solution 137 such as a poly hydroxyl alcohol; for example, glycol or glycerine-water or the like. The inside of the wall 127 is lined with an absorbent material 139 such as felt, which at the entrance portion 117 of the cloud chamber 115 extends over the top of the wall 127 and into the trough 135 containing the anti-icing solution 137. The absorbent material 139 wicks the anti-icing solution 137 from the trough 135 and thereby lines the entire inner wall of cloud chamber 115 with said anti-icing solution, thereby preventing the formation of frost on the wall of said cloud chamber. The elimination of frost is necessary to prevent the formation of extraneous ice crystals during the operation of the cloud chamber 115. The absorbent material 139 lining the wall 127 of the chamber 115 also acts as a sound absorbing material, and complements the echo reduction feature of the sound absorbing material 123 attached to lid 119.

At the lower end of the cloud chamber 115 is a runoff tube 141 which provides a means for allowing the anti-icing solution 137 flowing to the bottom of the chamber 115 to be removed from said chamber and pumped by suitable means 140 back to the trough 135, thus allowing for continuous operation of the device. While in the embodiment shown in FIGURE 8 a liquid anti-icing solution is employed to maintain the walls of the cloud chamber 115 frost-free, other suitable means may be employed to prevent frost from forming on the walls of the cloud chamber 115 within the teaching of the present invention.

The tube 113 entering the cloud chamber 115 through the hole 125 must be wide enough to prevent the formation of an air jet which, if formed, will travel straight down the chamber 115 without mixing and the air will not be cooled uniformally. This may be avoided by constructing the hole 125 wide enough to accomplish the desired result, or by attaching a small cylinder at the entrance to the chamber 115 and bringing the air in tangentially to generate a swirling air movement. This swirling movement will persist all the way down the chamber wall and promote efficient heat transfer from said walls.

The cloud chamber 115 also contains observation ports 143 for visual inspection of the formation of supercooled water droplets and ice crystals.

At the bottom of the cloud chamber 115 is an exit portion 145 to which is connected vertically (or horizontally by means of an elbow) a particle counter or sensor, which may be of the type disclosed in FIGURES 1, 2 or 3. The runoff tube 141 for the anti-icing solution is located ahead of the sensing device so that the solution does not run into the sensor. An air gap 147 is provided between the exit portion 145 of the cloud chamber 115 and the sensor device which allows warming air to come in contact with the sensor at that point so that frost does not develop on the lip 149 of the sensor. Usually, all that is necessary is to blow room temperature air with a small fan over the sensor to stop frost formation at the lip 149. However, if the temperature of the surrounding air is low, a small heating device may be required.

The embodiment of the present invention as shown in FIGURE 8 includes sound responsive signal detecting means comprising a microphone 26 located adjacent the straight entrance portion 14 of the sensor device ahead of the tapered portion 16 thereof. The microphone 26 could be located adjacent the exit portion 20 of the sensor or adjacent the capillary restriction portion 18. Since a plastic foam noise suppressor 32 cannot be used in this particular embodiment to suppress exit noise, the location of the microphone 26 adjacent the capillary restriction 18 gives a poor signal-to-noise ratio. The suppressor would plug with ice and is therefore not usable in the embodiment disclosed in FIGURE 8. To reduce the echo in the sensor, however, a substantial portion of the inside of chamber 115 is lined with sound absorbing material 123 and 139 as previously described. Said signal detecting means further includes an amplifier and an electronic pulse counter and recorder designated 153 to which said microphone 26 is electronically connected. The amplifier may also be connected to a loudspeaker.

Below the capillary restriction portion 18 of the sensor device is the exit portion 20 which, as described in conjunction with the embodiment of FIGURE 1, provides an abrupt change in diameter from the capillary restriction 18. Surrounding the exit portion 20 is a heating element 157 which prevents ice buildup in the exit portion 20 of the sensor. This can also be accomplished by placing a flask (150 ml. or so) in line with exit portion 20. The exit portion 20 is connected at the lower extremities thereof to suction or pump means, as described in connection with the embodiment disclosed in FIGURE 1.

A stethoscope 155 may be attached to the straight entrance portion 14 of the sensor device to count the ice crystals if no electronic pulse counter is available, or a stethoscope may be used in conjunction with electronic detection means to serve as a convenient check for the pulse counter.

In operation, air 101 containing minute particles enters the chamber 105 of the wetted wall tube 103 at port 102 and immediately comes into contact inside the chamber 105 with the water vapor which is produced by the heat generated from the heating coil 111 coming into contact with the water 107. The force for pulling the air through this system and through the cloud chamber 115 is the suction or pump means 13 attached to the lower extremities of the exit portion 20 of the sensing device. The moist air mixture then enters the cloud chamber 115 via curved tube 113 through hole 125. The temperature of the moist air mixture leaving the chamber 105 should be between 70 to 80 degrees Fahrenheit in order to take up enough moisture to form a good cloud. A certain amount of moisture is lost to the wall of chamber 115.

As the moist air mixture enters the cloud chamber 115, it is cooled by refrigeration coils 133. The excess moisture condenses on the dust particles in the air to form small cloud drops. The cloud is further cooled by said refrigeration coils to below freezing temperatures, and the dust particles become active icing nuclei, causing the water drops to freeze. The ice crystals thus formed have a much greater affinity for the water vapor in the cloud than the liquid water drops and grow at their expense to considerable size. As these ice crystals pass through the sensor at the bottom of cloud chamber 115, the acoustic capabilities of the particle counter enable the detection of a few large ice crystals amongst the millions of liquid water drops in the cloud. The smaller water drops are ignored by the sensor. As the ice crystals fall through the sensor they emit a signal which is detected by the microphone 26, and this signal is displayed on the electronic pulse counter and recorder 153.

From the foregoing description, it can be appreciated that the present invention provides a new means for automatically proving a reliable representative count of the quantity of particles contained in a gaseous atmosphere, such as air, and which can be continuously and economically operated over substantial periods of time. The present invention, which uses the sound emitted by the particles in a jet stream to detect their presence, is an extremely simple, inexpensive, rugged and easily operated device.

In the light of the above description, it is believed obvious that other modifications and variations of the invention will be suggested to those skilled in the art. It is, therefore, to be understood that changes may be made herein which are within the useful, intended scope of the invention as defined by the appended claims.

What is claimed is:
1. A minute particle detecting device comprising:
   a hollow tubular means of a predetermined diameter through which a stream of gaseous atmosphere containing minute particles is passed;
   an entrance portion disposed in said hollow tubular means through which said gaseous atmosphere is introduced into said hollow tubular means;
   a capillary restriction portion disposed in said hollow tubular means wherein the diameter of said capillary restriction portion is substantially less than said predetermined diameter;
   a linear tapered frusto-conical tubular portion disposed in said hollow tubular means between and operatively connecting said entrance portion and said capillary restriction portion whereby said stream of gaseous atmosphere is provided with a smooth transition from said entrance portion to said capillary restriction portion permitting laminar flow to be maintained;
   an exit portion in said hollow tubular means immediately adjacent the end of said capillary restriction portion;
   said exit portion being of substantially larger diameter than the diameter of said capillary restriction portion whereby an abrupt change in the diameter of said hollow tubular means is provided;
   means operatively connected to said hollow tubular means to enable said stream of gaseous atmosphere to flow through said hollow tubular means;
   and an acoustic sensing device in communication with said hollow tubular means whereby sound signals generated by each minute particle in said gaseous atmosphere passing through said hollow tubular means are detected by said acoustic sensing device.

2. The device set forth in claim 1 wherein said acoustic sensing device comprises:
   an electronic microphone;
   amplification means in operative relation to said microphone;
   and means operatively connected to said microphone and said amplification means for displaying said signals detected by said acoustic sensing device.

3. The device set forth in claim 2 wherein said means for displaying said amplified signals comprises an oscilloscope.

4. The device set forth in claim 2 wherein said means for displaying said signals comprises a loudspeaker.

5. The device set forth in claim 1 wherein:
   said acoustic sensing device comprises an electronic microphone;
   means communicating with said entrance portion of said hollow tubular means at a point adjacent the beginning of said frusto-conical tubular section for operatively connecting said microphone to said hollow tubular means;
   additional means operatively disposed relative to said microphone to amplify said sound signals generated by said particles;
   and further means connected to said additional means to display said amplified sound signals.

6. The device set forth in claim 1 wherein:
   said acoustic sensing device comprises an electronic microphone;
   means communicating with said capillary restriction portion of said hollow tubular means for operatively connecting said microphone to said hollow tubular means;
   additional means connected to said microphone to amplify said sound signals generated by said particles; and
   further means connected to said additional means to display said amplified sound signals.

7. The device as set forth in claim 1 wherein:
   said acoustic sensing device comprises an electronic microphone;
   means communcating with said exit portion immediately adjacent the end of said capillary restriction portion of said hollow tubular means for operatively connecting said microphone to said hollow tubular means;
additional means connected to said microphone to amplify said signals generated by said particles; and
further means connected to said additional means to display said amplified sound signals.

8. The device set forth in claim 1 wherein said acoustic sensing device is a stethoscope.

9. The device set forth in claim 7 comprising:
exit noise suppression means inserted in said hollow tubular means at a point below said exit portion.

10. The device set forth in claim 9, wherein said noise suppression means comprises:
a soft open porous plastic form of such dimensions that said foam does not become clogged with said particles as said particles pass through said hollow tubular means.

11. A device for measuring the quantity of icing nuclei particles present in a gaseous atmosphere comprising:
means for causing said particles to come into contact wiht supercooled water drops to form crystals of at least a predetermined size; and
sensing means operatively disposed with respect to said crystal forming means to permit the passage of said crystals therebetween the acoustically detecting the quantity of said crystals.

12. A device for measuring the quantity of icing nuclei particles present in a gaseous atmosphere as set forth in claim 11, wherein said crystal forming means comprises:
additional means for eliminating spurious reflections of sounds.

13. A device as set forth in claim 11, wherein said crystal forming means comprises:
a chamber; and
sound absorbing material lining substantially the inside portion of said chamber.

14. A device for measuring the quantity of icing nuclei particles present in a gaseous atmosphere comprising:
a cloud chamber;
means for introducing moist air containing minute particles into said cloud chamber;
refrigeration means operatively associated with said cloud chamber to supercool the moisture in said air in said cloud chamber to a temperature below the freezing point of said moisture whereby crystals of at least a predetermined size are formed when said minute particles come into contact with said supercooled moisture;
sensing means operatively disposed with respect to said cloud chamber to permit the passage of said crystals from said cloud chamber to said sensing means whereby each crystal above said predetermined size generates an audible signal in said sensing device; and
sound responsive signal receiving means operatively disposed with respect to said sensing means for detecting and displaying said audible signals.

15. A device for measuring the quantity of icing nuclei particles present in a gaseous atmosphere comprising:
a cloud chamber having an upper entrance portion and a lower exit portion;
inwardly tapering wall means joining said entrance portion to said exit portion providing a larger opening at said entrance portion relative to said exit portion;
lid means removably affixed to said entrance portion of said cloud chamber substantially covering said entrance portion;
a hole located in said lid means providing a relatively small opening into said cloud chamber through said cap means;
a source of air containing minute particles;
humidifying means including water and water vaporization means, whereby said air and said water are heated to form a moist air mixture;
tube means operatively disposed between said humidifying means and said hole enabling said moist air mixture to be transmitted into said cloud chamber;
refrigeration means operatively disposed with respect to said cloud chamber to lower the temperature of said moist air mixture in said cloud chamber below the freezing point of said mixture, whereby supercooled droplets of water are formed and crystals above a predetermined size are created when said particles come into contact with said supercooled droplets;
means for preventing frost from forming on the wall means of said cloud chamber;
sensing means operatively disposed with respect to said exit portion of said cloud chamber to permit the passage of said crystals from said cloud chamber to said sensing means, whereby each crystal above said predetermined size generates an audible signal in said sensing means;
sound responsive signal receiving means operatively disposed with respect to said sensing means for detecting and displaying said audible signals; and
suction means operatively disposed with respect to said sensing means and said cloud chamber for enabling said moist air mixture and said crystals to be transmitted through said cloud chamber and said sensing means.

16. The device set forth in claim 15 wherein said means for preventing frost from forming on the wall means of said cloud chamber comprises:
trough means disposed at the top of said wall means of said cloud chamber adjacent said entrance portion;
wick means extending from the inner portion of said trough and along said wall means whereby said wall means are substantially covered by said wick means;
said trough means containing an anti-icing solution which is transmitted to said wall means by said wick means;
runoff collection means adjacent said exit portion of said cloud chamber ahead of said sensing means whereby said anti-icing solution is collected at the lower portion of said cloud chamber; and
recirculation means connecting said runoff collection means to said trough means whereby said anti-icing solution is transferred from said runoff collection means to said trough means.

17. The device set forth in claim 15 wherein said cap means comprises a layer of sound absorbing material on the face thereof adjacent the inside of said cloud chamber.

18. The device set forth in claim 15 wherein said sensing means includes hollow tubular means of a predetermined diameter to which said crystals pass from said cloud chamber comprising:
an upper entrance portion;
a capillary restriction portion of substantially smaller diameter than said entrance portion;
a linear tapered frusto-conical tubular portion connecting said upper entrance portion to said capillary restriction portion;
an exit portion at the end of said capillary restriction means wherein the diameter of said hollow tubular means abruptly changes from said substantially smaller diameter to said predetermined diameter.

References Cited

UNITED STATES PATENTS

| 1,886,914 | 11/1932 | Slichter | 73—70 |
| 2,760,184 | 8/1956 | Beattie | 73—194 |
| 3,209,344 | 9/1965 | Miller | 340—239 |

RICHARD C. QUEISSER, Primary Examiner.

C. I. McCLELLAND, Assistant Examiner.

U.S. Cl. X.R.

340—239